(12) United States Patent
Yasumoro et al.

(10) Patent No.: US 11,961,534 B2
(45) Date of Patent: Apr. 16, 2024

(54) IDENTIFYING USER OF VOICE OPERATION BASED ON VOICE INFORMATION, VOICE QUALITY MODEL, AND AUXILIARY INFORMATION

(71) Applicant: NEC CORPORATION, Tokyo (JP)

(72) Inventors: Noritada Yasumoro, Tokyo (JP); Masanori Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 16/633,792

(22) PCT Filed: Jul. 20, 2018

(86) PCT No.: PCT/JP2018/027239
§ 371 (c)(1),
(2) Date: Jan. 24, 2020

(87) PCT Pub. No.: WO2019/021953
PCT Pub. Date: Jan. 31, 2019

(65) Prior Publication Data
US 2020/0202886 A1      Jun. 25, 2020

(30) Foreign Application Priority Data

Jul. 26, 2017  (JP) ................... 2017-144336

(51) Int. Cl.
*G10L 25/60* (2013.01)
*G01S 19/01* (2010.01)
(Continued)

(52) U.S. Cl.
CPC .............. *G10L 25/60* (2013.01); *G01S 19/01* (2013.01); *G10L 17/00* (2013.01); *G10L 17/08* (2013.01); *G10L 17/14* (2013.01); *G10L 17/24* (2013.01)

(58) Field of Classification Search
CPC ......... G10L 25/60; G10L 17/00; G10L 17/08; G10L 17/14; G10L 17/24; G10L 17/06;
(Continued)

(56) References Cited

U.S. PATENT DOCUMENTS

| 6,341,263 B1 | 1/2002 | Yamada et al. |
| 7,266,189 B1 | 9/2007 | Day |

(Continued)

FOREIGN PATENT DOCUMENTS

| JP | H10-301755 A | 11/1998 |
| JP | 11-327586 A | 11/1999 |

(Continued)

OTHER PUBLICATIONS

Araki, Shoko et al., "System for identifying voice of speaker in meeting using voice section detection and directional information, and evaluation therefore", Proceedings of the Acoustical Society of Japan, Mar. 2008, pp. 1-9.

(Continued)

*Primary Examiner* — Jesse S Pullias

(57) ABSTRACT

A voice operation apparatus and a control method thereof that can further improve accuracy of talker identification are provided. Provided is a voice operation apparatus including a talker identification unit that identifies a user as a talker of a voice operation based on voice information and a voice quality model of a user registered in advance, and a voice operation recognition unit that performs voice recognition on the voice information and generates voice operation information, wherein the talker identification unit identifies a talker by using, as auxiliary information, at least one of the voice operation information, position information on a voice operation apparatus, direction information on a talker, distance information on a talker, and time information.

13 Claims, 7 Drawing Sheets

(51) Int. Cl.
*G10L 17/00* (2013.01)
*G10L 17/08* (2013.01)
*G10L 17/14* (2013.01)
*G10L 17/24* (2013.01)

(58) Field of Classification Search
CPC ....... G10L 17/12; G10L 15/22; G10L 15/265; G01S 19/01; G06F 3/167; H04M 2201/40
USPC .................................. 704/231–257, 270–275
See application file for complete search history.

(56) References Cited

U.S. PATENT DOCUMENTS

| | | | |
|---|---|---|---|
| 9,721,566 B2* | 8/2017 | Newendorp | G10L 15/32 |
| 9,721,586 B1* | 8/2017 | Bay | H04R 1/345 |
| 10,283,142 B1* | 5/2019 | Yu | G10L 25/30 |
| 10,418,033 B1* | 9/2019 | Mutagi | G10L 15/30 |
| 2005/0049862 A1 | 3/2005 | Choi et al. | |
| 2008/0312924 A1 | 12/2008 | De Los Reyes et al. | |
| 2010/0020951 A1* | 1/2010 | Basart | H04M 1/575 |
| | | | 379/142.01 |
| 2012/0078624 A1 | 3/2012 | Yook et al. | |
| 2013/0030794 A1 | 1/2013 | Ikeda et al. | |
| 2013/0332165 A1* | 12/2013 | Beckley | G10L 15/20 |
| | | | 704/246 |
| 2015/0058003 A1* | 2/2015 | Mohideen | G10L 15/20 |
| | | | 704/233 |
| 2015/0058015 A1* | 2/2015 | Mitsufuji | G10L 21/003 |
| | | | 704/243 |
| 2015/0138333 A1* | 5/2015 | DeVaul | G06F 3/167 |
| | | | 348/78 |
| 2015/0255068 A1* | 9/2015 | Kim | G10L 17/04 |
| | | | 704/246 |
| 2016/0072915 A1* | 3/2016 | Decanne | G06F 16/24578 |
| | | | 715/728 |
| 2016/0125879 A1 | 5/2016 | Lovitt | |
| 2016/0180852 A1* | 6/2016 | Huang | G10L 25/03 |
| | | | 704/246 |
| 2018/0018964 A1* | 1/2018 | Reilly | G10L 15/22 |

FOREIGN PATENT DOCUMENTS

| | | |
|---|---|---|
| JP | 2000-250593 A | 9/2000 |
| JP | 2004-350226 A | 12/2004 |
| JP | 2005-078072 A | 3/2005 |
| JP | 2009-265567 A | 11/2009 |
| JP | 2010-286702 A | 12/2010 |
| JP | 2013-029690 A | 2/2013 |
| JP | 2017-090613 A | 5/2017 |
| JP | 2017-116876 A | 6/2017 |
| WO | 2016/073321 A1 | 5/2016 |

OTHER PUBLICATIONS

International Search Report for PCT/JP2018/027239 dated Sep. 25, 2018 [PCT/ISA/210].
Communication dated Jul. 31, 2020, from the European Patent Office in European Application No. 18838381.4.
Japanese Office Action for JP Application No. 2021-127871 dated Jul. 5, 2022 with English Translation.

* cited by examiner

US 11,961,534 B2

IDENTIFYING USER OF VOICE OPERATION BASED ON VOICE INFORMATION, VOICE QUALITY MODEL, AND AUXILIARY INFORMATION

CROSS REFERENCE TO RELATED APPLICATIONS

This application is a National Stage of International Application No. PCT/JP2018/027239 filed Jul. 20, 2018, claiming priority based on Japanese Patent Application No. 2017-144336 filed Jul. 26, 2017.

TECHNICAL FIELD

The example embodiments relate to a voice operation apparatus having a talker identification function.

BACKGROUND ART

In recent years, AI speakers (also referred to as smart speakers) having a voice assistant function that can be operated by voice have attracted attention. According to such a voice operation apparatus, since a user can search for desired information and operate a linked household appliance by voice, a user can perform a desired operation without using its hand while doing work such as housework, cleaning, washing, or the like. Further, a voice operation apparatus can be realized at low cost with a simple configuration including a microphone, a speaker, and a voice recognition processor as minimum components and thus can be easily arranged in a plurality of rooms.

The voice operation apparatus disclosed in Patent Literature 1 has a talker identification function of identifying who the talker is based on voice quality of the voice in addition to a voice recognition function of recognizing a voice operation performed by a user. In such a way, a service customized in accordance with the user's preference can be provided.

CITATION LIST

Patent Literature

PTL 1: Japanese Patent Application Laid-open No. 2010-286702

SUMMARY

Technical Problem

However, despite the progress of research and development of the talker identification technique, the identification accuracy is still not high. In particular, in AI speakers, although it is desired that the operation voice be atypical in order to avoid impersonation using a recorded operation voice, it is particularly difficult to identify a talker when the operation voice is atypical and is a short sentence. Further, since the voice quality of voice uttered by a user significantly changes in accordance with the environment such as a distance from a voice source, a surrounding temperature, reflection, or the like, it is difficult to identify a talker only by comparing an operation voice with a single voice quality model of a user registered in advance. The example embodiments intends to provide a voice operation apparatus and a control method thereof that can further improve accuracy of talker identification.

Solution to Problem

According to an example aspect of the example embodiments, provided is a voice operation apparatus including a talker identification unit that, based on voice information and a voice quality model of a user registered in advance, identifies the user as a talker of a voice operation; and a voice operation recognition unit that performs voice recognition on the voice information and generates voice operation information, wherein the talker identification unit identifies a talker by using, as auxiliary information, at least one of the voice operation information, position information on a voice operation apparatus, direction information on a talker, distance information on a talker, and time information.

Further, according to another example aspect of the example embodiments, provided is a control method of a voice operation apparatus having a talker identification unit that, based on voice information and a voice quality model of a user registered in advance, identifies the user as a talker of a voice operation and a voice operation recognition unit that performs voice recognition on the voice information and generates voice operation information, and the control method includes a step of at the talker identification unit, identifying a talker by using, as auxiliary information, at least one of the voice operation information, position information on a voice operation apparatus, direction information on a talker, distance information on a talker, and time information.

Effects

According to the example embodiments, a voice operation apparatus and a control method thereof that can further improve accuracy of talker identification can be provided.

DESCRIPTION OF EXAMPLE EMBODIMENTS

The example embodiments will be described below by using the drawings. Note that the example embodiments is not limited to the following example embodiments, and modifications can be appropriately made within the scope without departing from the spirit thereof. Throughout the drawings, components having the same function or corresponding functions are labeled with the same references, and the description thereof may be omitted or simplified.

First Example Embodiment

Figure 1:
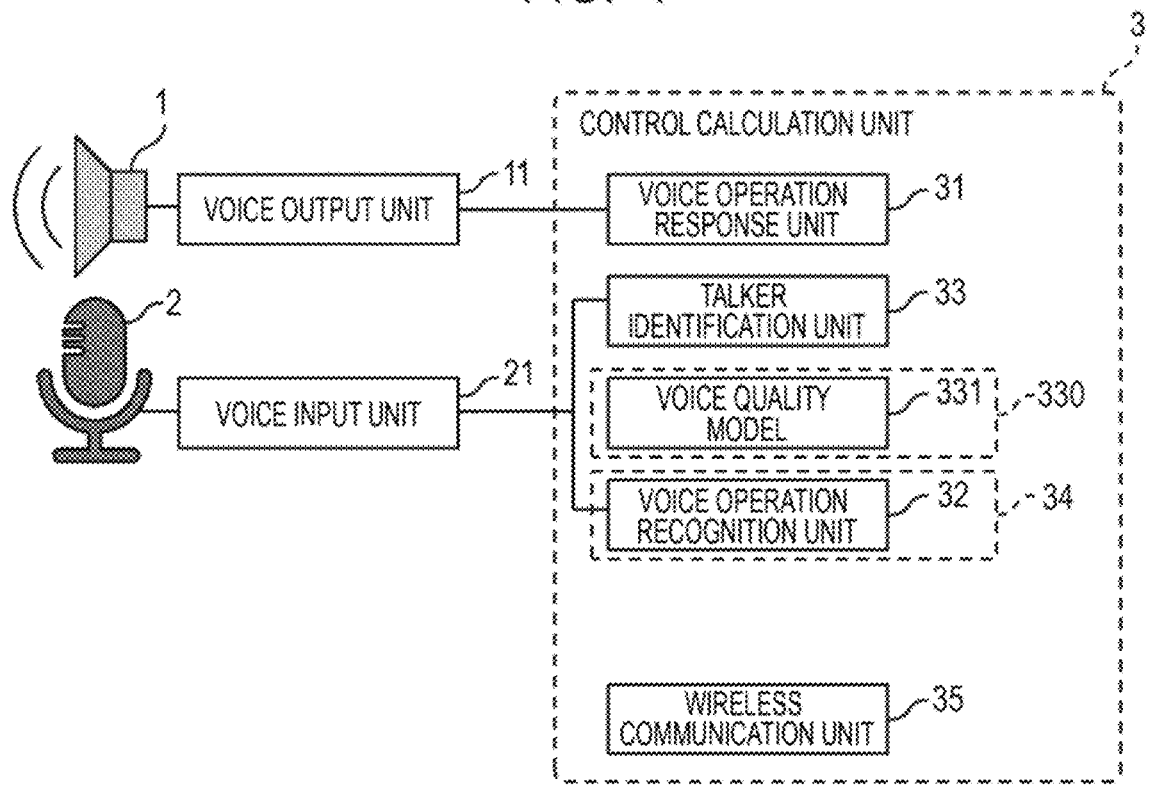
FIG. 1 is a block diagram schematically illustrating a configuration of a voice operation apparatus according to a first example embodiment.

FIG. 1 is a block diagram schematically illustrating a configuration of a voice operation apparatus according to a first example embodiment. FIG. 1 illustrates an example in which the voice operation apparatus of the present example embodiment is applied to an AI speaker. This diagram is a mere example, and the voice operation apparatus of the present example embodiment can also be applied to a robot, a smartphone, a car navigation system, or the like that can recognize a voice operation performed by a user, for example. The voice operation apparatus of the present example embodiment is formed of a speaker 1, a microphone 2, a voice output unit 11, a voice input unit 21, and a control calculation unit 3. In a typical AI speaker, these components are stored in a casing of the speaker 1.

The control calculation unit 3 is a processor such as a CPU that executes a program stored in a storage medium and performs control and calculation of each component of the voice operation apparatus of the present example embodiment. The control calculation unit 3 includes a storage medium storing a program (not illustrated). The control calculation unit 3 has a voice operation response unit 31, a voice operation recognition unit 32, a talker identification unit 33, a voice quality model 331, and a wireless communication unit 35.

The microphone 2 converts voice vibration generated by a voice operation of a user into an electrical signal. The voice input unit 21 converts an analog signal input from the microphone 2 into digital voice information and performs voice signal processing for voice information. Here, the voice input unit 21 may be configured to be included in the microphone 2.

The voice operation recognition unit 32 performs voice recognition on voice information input from the voice input unit 21 and generates voice operation information. The control calculation unit 3 performs an operation process corresponding to the generated voice operation information. Specifically, the control calculation unit 3 performs a desired information search and an operation process of a linked household appliance via the wireless communication unit 35.

The voice operation response unit 31 then informs a user of a performance result of an operation process via the voice output unit 11 and the speaker 1. Specifically, the voice output unit 11 converts digital information input from the voice operation response unit 31 into an analog signal. The speaker 1 converts an electrical signal input from the voice output unit 11 into voice vibration and outputs the voice vibration. Here, the voice output unit 11 may be configured to be included in the speaker 1.

A storage medium of the control calculation unit stores registered user information 330. In the registered user information 330, the voice quality model 331 of a user is registered in advance. The talker identification unit 33 calculates the similarity between voice information input from the voice input unit 21 and the voice quality model 331 of a user and identifies the user having the highest similarity as a talker of a voice operation. Thus, a service in accordance with user's preference can be provided, and user convenience can be further improved. For example, information customized in accordance with user's preference is registered in the registered user information 330 in advance, and it is possible to perform an operation process corresponding to the voice operation information in accordance with the user's preference or prohibit a voice operation performed by a user other than users who are registered in the registered user information 330 in advance.

As described above, however, despite the progress of research and development of the talker identification technique, the identification accuracy is still not high. Accordingly, the talker identification unit 33 of the example embodiments is characterized by identifying a talker by using, as auxiliary information, at least one of voice operation information, position information on the voice operation apparatus, direction information on a talker, distance information on a talker, and time information. For example, in the voice operation apparatus of the present example embodiment illustrated in FIG. 1, the voice operation recognition unit 32 is used as an auxiliary information calculation unit 34 that calculates auxiliary information.

Figure 2:
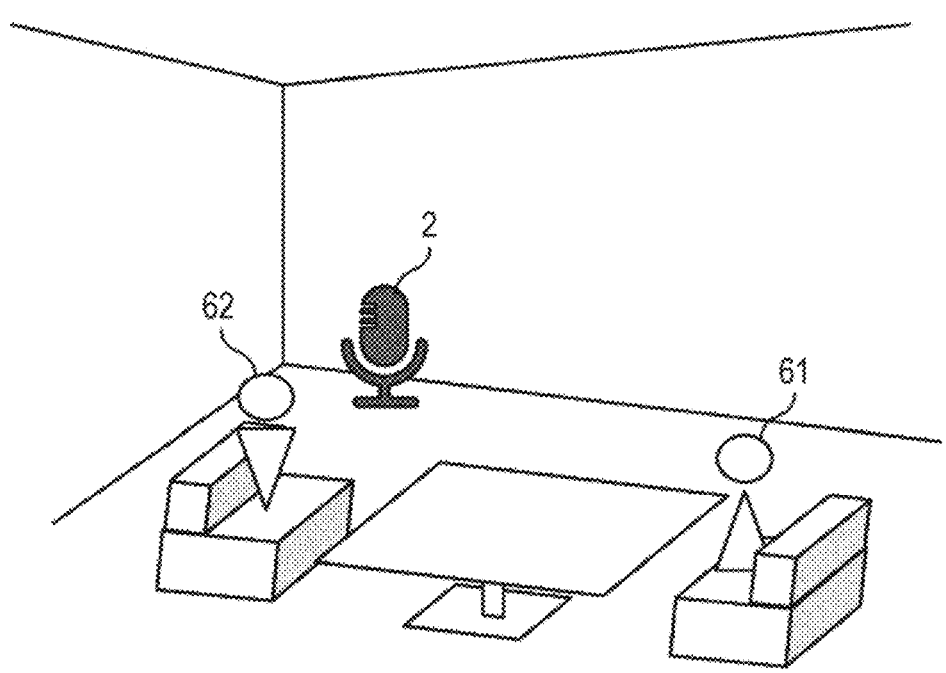
FIG. 2 is a diagram illustrating an arrangement example of the voice operation apparatus according to the example embodiments.

FIG. 2 is a diagram illustrating an arrangement example of the voice operation apparatus according to the example embodiments. The voice operation apparatus according to the example embodiments is arranged at the position of the microphone 2 illustrated in FIG. 2. The users 61 and 62 present in the room of FIG. 2 are, for example, a mother and a father who stay relax at a living room in their house.

In such a case, the talker identification unit 33 of the present example embodiment determines that a talker of a voice operation is likely to be the mother when the instruction by a voice operation is to acquire weather information, for example. Alternatively, the talker identification unit 33 of the present example embodiment determines that a talker of a voice operation is likely to be the father when the instruction by a voice operation is to acquire stock price information. The talker identification unit 33 then corrects the similarity to the voice quality model 331 of a user in accordance with the voice operation information.

Here, information such as a keyword unique to a user may be registered in advance in the registered user information 330 in association with the keyword included in voice operation information or may be learned at any time based on the frequency of the keyword used by the user. When the voice operation apparatus learns, a correction value of a similarity is registered on a user basis in the registered user information 330 in advance, and a result identifying a talker is reflected in the correction value. Thereby, the talker identification unit 33 learns the correlation between the auxiliary information unique to a user and the correction value of the similarity, so that every time an operation process corresponding to the voice operation is performed, the accuracy of talker identification can be improved.

Figure 3:
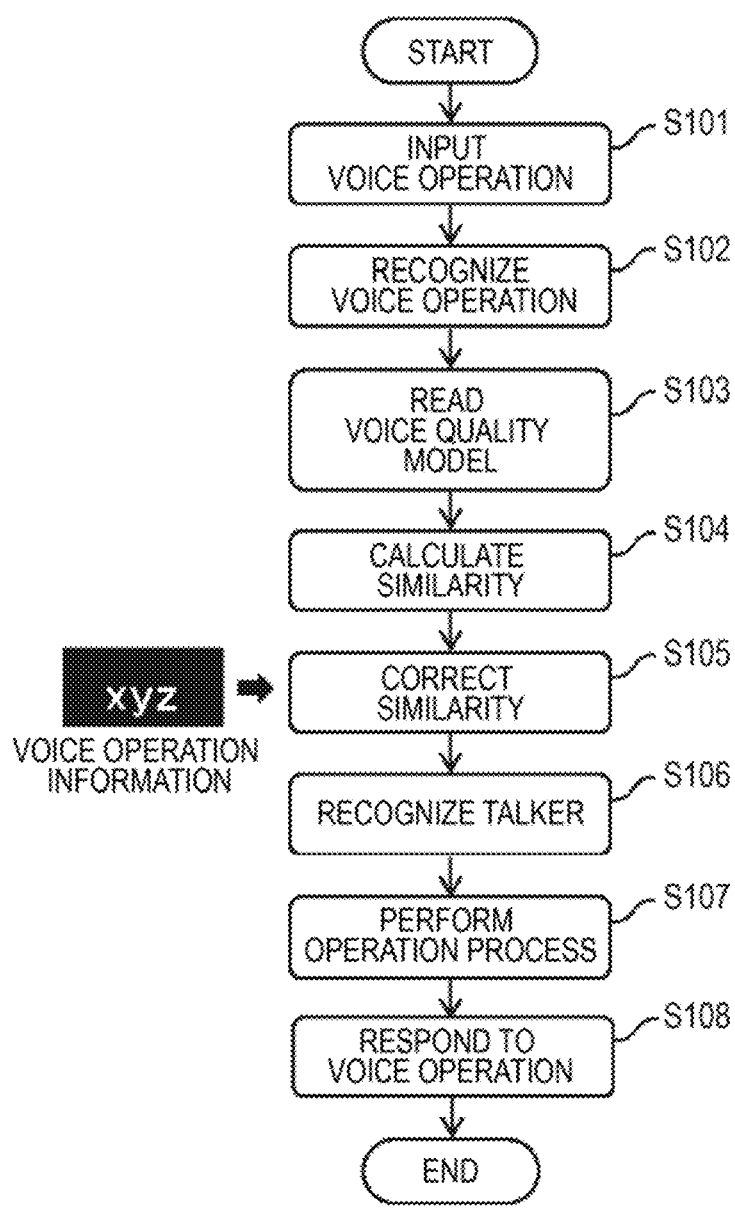
FIG. 3 is a flowchart illustrating a control method of the voice operation apparatus according to the first example embodiment.

FIG. 3 is a flowchart illustrating a control method of the voice operation apparatus according to the first example embodiment. In step S101, the microphone 2 and the voice input unit 21 convert voice vibration generated by a voice operation of a user into an electrical signal. In step S102, the voice operation recognition unit 32 performs voice recognition on voice information input from the microphone 2 and the voice input unit 21 and generates voice operation information. Here, a well-known technique may be used as a voice recognition method performed by the voice operation recognition unit 32.

In step S103, the talker identification unit 33 reads the voice quality model 331 of the user registered in the registered user information 330 in advance together with the registered user information 330. In step S104, the talker identification unit 33 calculates the similarity between voice information input from the voice input unit 21 and a voice quality model 331 of the user.

Here, a well-known technique may be used as a talker recognition method performed by the talker identification unit 33. For example, a distance s between a voice waveform $f_0$ of the voice quality model 331 of a user registered in the registered user information 330 in advance and a voice waveform $f_1$ of the voice information input from the voice input unit 21 is calculated by the following Equation (1), and the reciprocal 1/s thereof is used as a similarity. Here, Z is the sum for a plurality of times t within a predetermined period. Further, the voice waveforms $f_0$ and $f_1$ are normalized as appropriate.

$$s^2 = \Sigma\{f_1(t) - f_0(t)\}^2 \quad (1)$$

Alternatively, the distance s between a frequency spectrum $F_0$ of the voice quality model 331 of a user registered in the registered user information 330 in advance and a frequency spectrum $F_1$ of the voice information input from the voice input unit 21 is calculated by the following Equation (2), and the reciprocal 1/s thereof may be used as a similarity. Here, Z is the sum for a plurality of frequencies k within a predetermined range. Further, the frequency spectrum $F_0$ and $F_1$ are normalized as appropriate.

$$s^2 = \Sigma\{F_1(k) - F_0(k)\}^2 \quad (2)$$

In step S105, the talker identification unit 33 corrects the similarity calculated from the above Equations (1) or (2) in accordance with a keyword included in voice operation information. For example, when the instruction by a voice operation is to acquire weather information, +5 points are added to the similarity 1/s of a voice waveform of a mother's voice quality model 331. Alternatively, when the instruction by a voice operation is to acquire stock price information, +5 points are added to the similarity 1/s of a voice waveform of a father's voice quality model 331. Here, the correction value of the similarity may be appropriately determined on a keyword basis in accordance with application, a user, or the like.

In step S106, the talker identification unit 33 identifies a user having the highest corrected similarity as a talker of the voice operation. In step S107, the control calculation unit 3 performs an operation process corresponding to the voice operation information described above in accordance with preference of the identified user. In step S108, the voice operation response unit 31 informs the user of a result of the process performed in step S107 by voice via the speaker 1 and the voice output unit 11.

As described above, in the voice operation apparatus of the present example embodiment, the registered user information includes a keyword unique to the user, and the speaker identification unit corrects the similarity in accordance with the keyword included in the voice operation information. According to such a configuration, a voice operation apparatus and a control method thereof that can further improve accuracy of talker identification can be provided.

Second Example Embodiment

Figure 4:
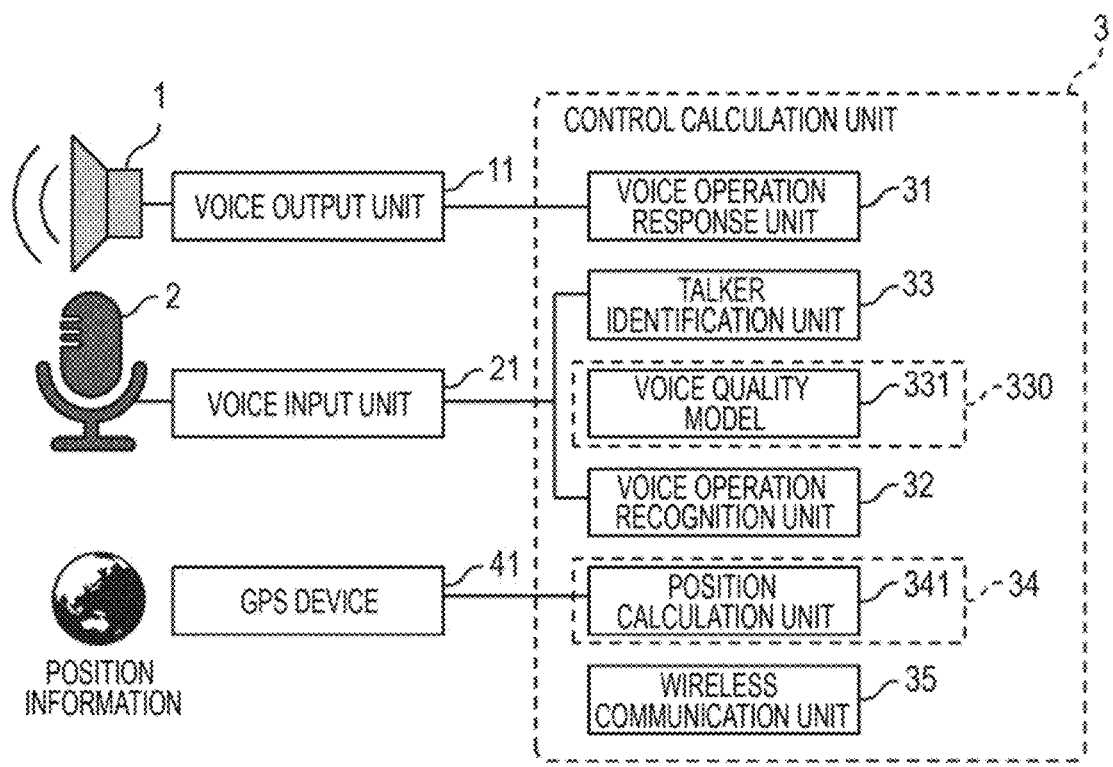
FIG. 4 is a block diagram schematically illustrating a configuration of a voice operation apparatus according to a second example embodiment.

FIG. 4 is a block diagram schematically illustrating a configuration of a voice operation apparatus according to a second example embodiment. The voice operation apparatus of the present example embodiment is different from the above first example embodiment in that a GPS device 41 and a position calculation unit 341 are provided. The other features are substantially the same as those of the first example embodiment. Features that are different from the first example embodiment will be mainly described below.

The GPS device 41 can acquire Global Positioning System (GPS) information. The position calculation unit 341 uses GPS information input from the GPS device 41 to calculate information on a position at which the voice operation apparatus is arranged. Here, the GPS device 41 may configure to include the position calculation unit 341. In such a way, the voice operation apparatus of the present example embodiment is characterized by having the position calculation unit 341 as the auxiliary information calculation unit 34 that calculates the auxiliary information.

As described above, since a voice quality of voice uttered by a user significantly changes in accordance with the environment such as a distance from a voice source, a surrounding temperature, reflection, or the like, it is difficult to identify a talker by comparing an operation voice with a single voice quality model 331 of a user registered in advance.

Accordingly, the registered user information 330 of the present example embodiment has a plurality of voice quality models 331 on a user basis as a database. The talker identification unit 33 then selects the voice quality model 331 in accordance with the position information of the voice operation apparatus which is calculated by the position calculation unit 341. For example, when the voice operation apparatus is arranged in a one's house, the voice quality model 331 suitable for the one's house environment is selected. Alternatively, when the voice operation apparatus is arranged in a workplace, the voice quality model 331 suitable for the workplace environment is selected. Further, alternatively, when the voice operation apparatus is arranged in a car which is moving, the voice quality model 331 suitable for the environment in the car is selected. These plurality of voice quality models 331 are registered in advance in the registered user information 330 in association with the position information of the voice operation apparatus.

Thus, even when the voice operation apparatus of the present example embodiment is applied to a device that may move, such as a robot, a smartphone, or a car navigation system, the accuracy of talker identification can be further improved by selecting the voice quality model 331 suitable for the surrounding environment.

Figure 5:
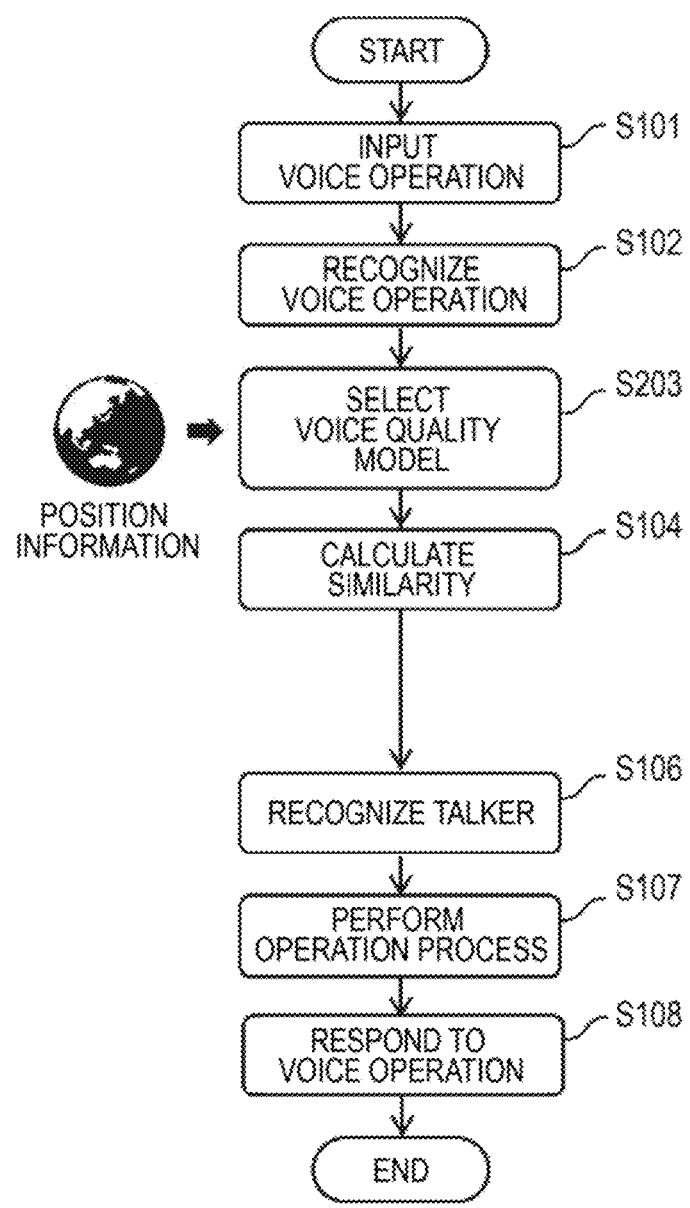
FIG. 5 is a flowchart illustrating a control method of the voice operation apparatus according to the second example embodiment.

FIG. 5 is a flowchart illustrating a control method of the voice operation apparatus according to the second example embodiment. The flowchart of the present example embodiment illustrated in FIG. 5 is different from FIG. 3 of the above first example embodiment in that the voice quality model 331 is selected in accordance with the position information of the voice operation apparatus when the voice quality model 331 is read in step S203. Note that, in the flowchart of FIG. 5, although a correction process of a similarity illustrated in step S105 of the first example embodiment in FIG. 3 is omitted, step S105 may be performed together also in the present example embodiment in the same manner as illustrated in FIG. 3.

As described above, the voice operation apparatus of the present example embodiment further has the GPS device that acquires the position of the voice operation apparatus as position information. Further, the registered user information has a plurality of voice quality models on a user basis, and the talker identification unit selects the voice quality model in accordance with the position information. According-ing to such a configuration, a voice operation apparatus and a control method thereof that can improve accuracy of talker identification can also be provided.

Third Example Embodiment

Figure 6:
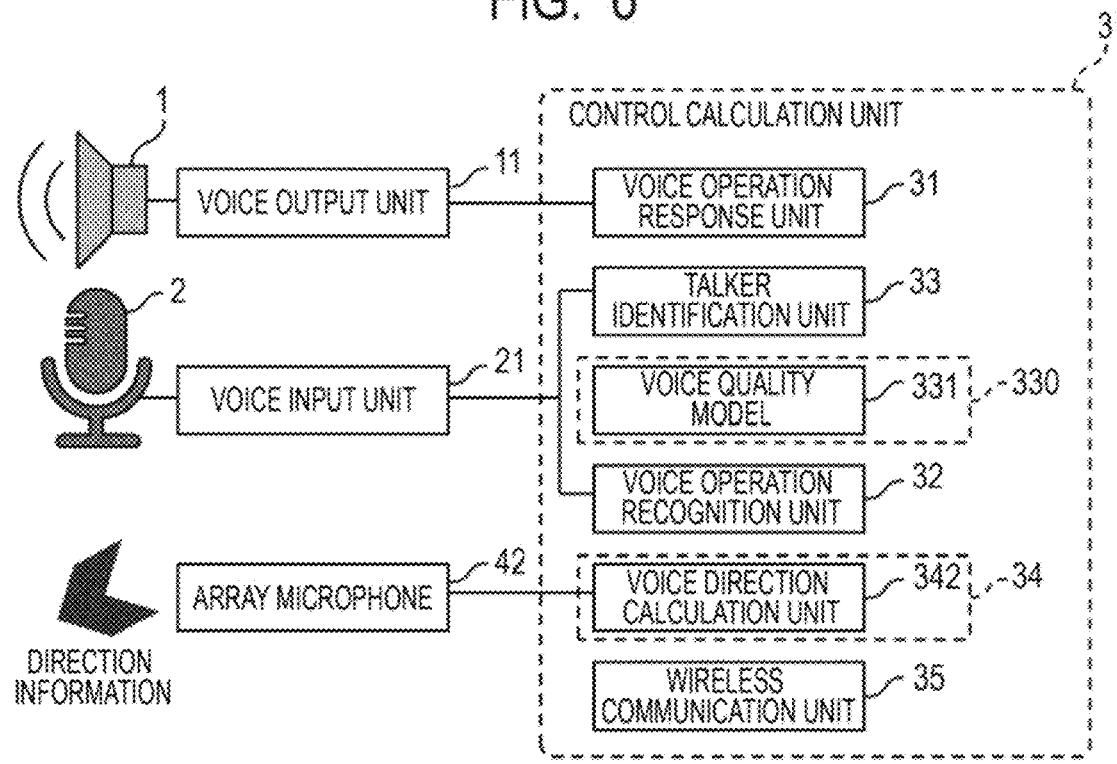
FIG. 6 is a block diagram schematically illustrating a configuration of a voice operation apparatus according to a third example embodiment.

FIG. 6 is a block diagram schematically illustrating a configuration of a voice operation apparatus according to a third example embodiment. The voice operation apparatus of the present example embodiment is different from the above first example embodiment in that an array microphone 42 and a voice direction calculation unit 342 are provided. The other features are substantially the same as those of the first example embodiment. Features that are different from the first example embodiment will be mainly described below.

The array microphone 42 has a configuration which arranges a plurality of microphones and can determine the direction of a talker of a voice operation. The voice direction calculation unit 342 calculates the direction information on a talker viewed from the voice operation apparatus based on information input from the array microphone 42. Here, the voice direction calculation unit 342 may be configured to be included in the array microphone 42. In such a way, the voice operation apparatus of the present example embodiment is characterized by having the voice direction calculation unit 342 as the auxiliary information calculation unit 34 that calculates auxiliary information.

For example, in the room illustrated in FIG. 2, a chair on the left side of the voice operation apparatus is a seat for the mother, and a chair on the right side of the voice operation apparatus is a seat for the father. In such a case, the talker identification unit 33 of the present example embodiment determines that the talker of the voice operation is likely to be the mother when the talker direction of the voice operation is the left side, for example. Alternatively, the talker identification unit 33 of the present example embodiment determines that the talker of the voice operation is likely to be the father when the talker direction of the voice operation is the right side. Such information unique to a user is registered in advance in the registered user information 330 in association with the direction information.

The flowchart of the above first example embodiment illustrated in FIG. 3 and the flowchart of the above second example embodiment illustrated in FIG. 5 can be applied to a voice operation method according to the voice operation apparatus of the present example embodiment except that the auxiliary information is direction information.

As described above, the voice operation apparatus of the present example embodiment further has the array microphone that acquires the direction of a talker of a voice operation as the direction information. Further, the talker identification unit identifies a talker by using the direction information. According to such a configuration, a voice operation apparatus and a control method thereof that can further improve accuracy of talker identification can also be provided. Note that, instead of further including the array microphone 42, the microphone 2 may be formed of a plurality of microphones to identify the direction of a talker of a voice operation.

Fourth Example Embodiment

Figure 7:
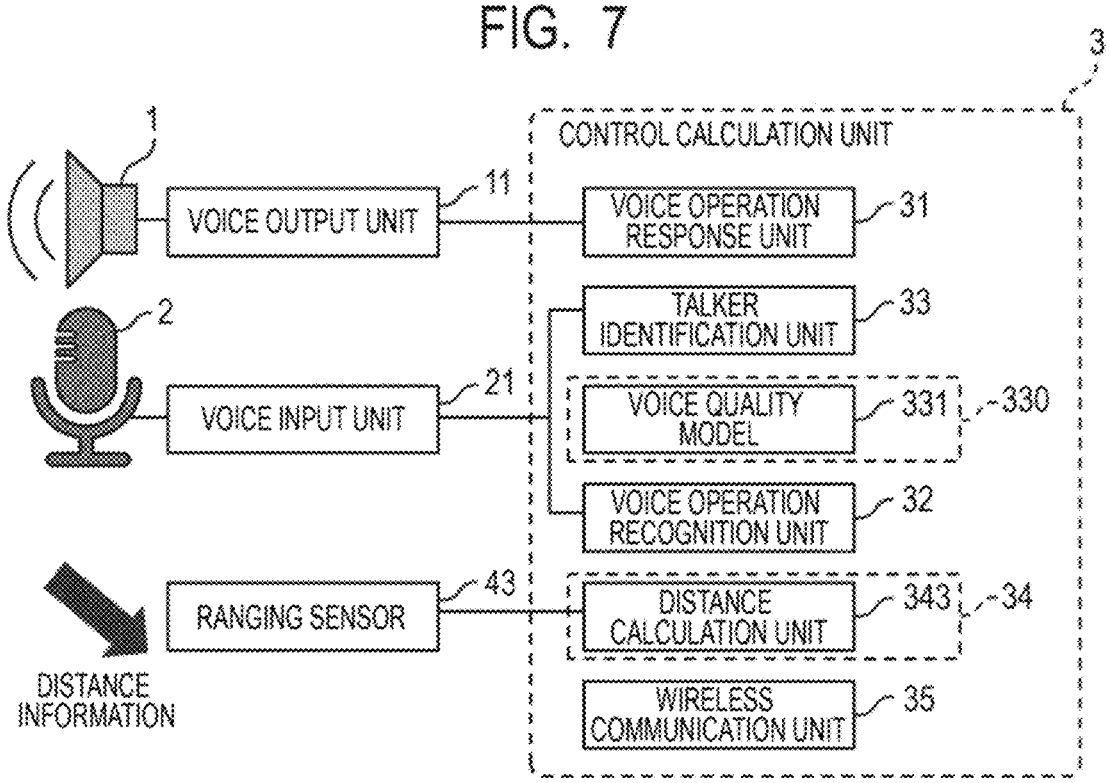
FIG. 7 is a block diagram schematically illustrating a configuration of a voice operation apparatus according to a fourth example embodiment.

FIG. 7 is a block diagram schematically illustrating a configuration of a voice operation apparatus according to a fourth example embodiment. The voice operation apparatus of the present example embodiment is different from the above first example embodiment in that a ranging sensor 43 and a distance calculation unit 343 are provided. The other features are substantially the same as those of the first example embodiment. Features that are different from the first example embodiment will be mainly described below.

The ranging sensor 43 can acquire the distance to a talker. For example, a method of measuring a distance by using a parallax or a well-known technique of measuring a distance by using a reflected wave of light or a radio wave may be used as a ranging scheme. The distance calculation unit 343 calculates the distance from the voice operation apparatus to a talker based on information input from the ranging sensor 43. Here, the distance calculation unit 343 may be configured to be included in the ranging sensor 43. In such a way, the voice operation apparatus of the present example embodiment is characterized by having the distance calculation unit 343 as the auxiliary information calculation unit 34 that calculates auxiliary information.

For example, in the room illustrated in FIG. 2, the chair farther from the voice operation apparatus is a seat for the mother, and the chair closer to the voice operation apparatus is a seat for the father. In such a case, the talker identification unit 33 of the present example embodiment determines that the talker of a voice operation is likely to be the mother when the distance from the voice operation apparatus to the talker is long, for example. Alternatively, the talker identification unit 33 of the present example embodiment determines that the talker of a voice operation is likely to be the father when the distance from the voice operation apparatus to the talker is short. Such information unique to a user is registered in advance in the registered user information 330 in association with the distance information.

The flowchart of the above first example embodiment illustrated in FIG. 3 and the flowchart of the above second example embodiment illustrated in FIG. 5 can be applied to a voice operation method according to the voice operation apparatus of the present example embodiment except that the auxiliary information is distance information.

As described above, the voice operation apparatus of the present example embodiment further has the ranging sensor that acquires the distance to a talker of a voice operation as the distance information. Further, the talker identification unit identifies a talker by using the distance information. According to such a configuration, a voice operation apparatus and a control method thereof that can further improve accuracy of talker identification can also be provided.

Fifth Example Embodiment

Figure 8:
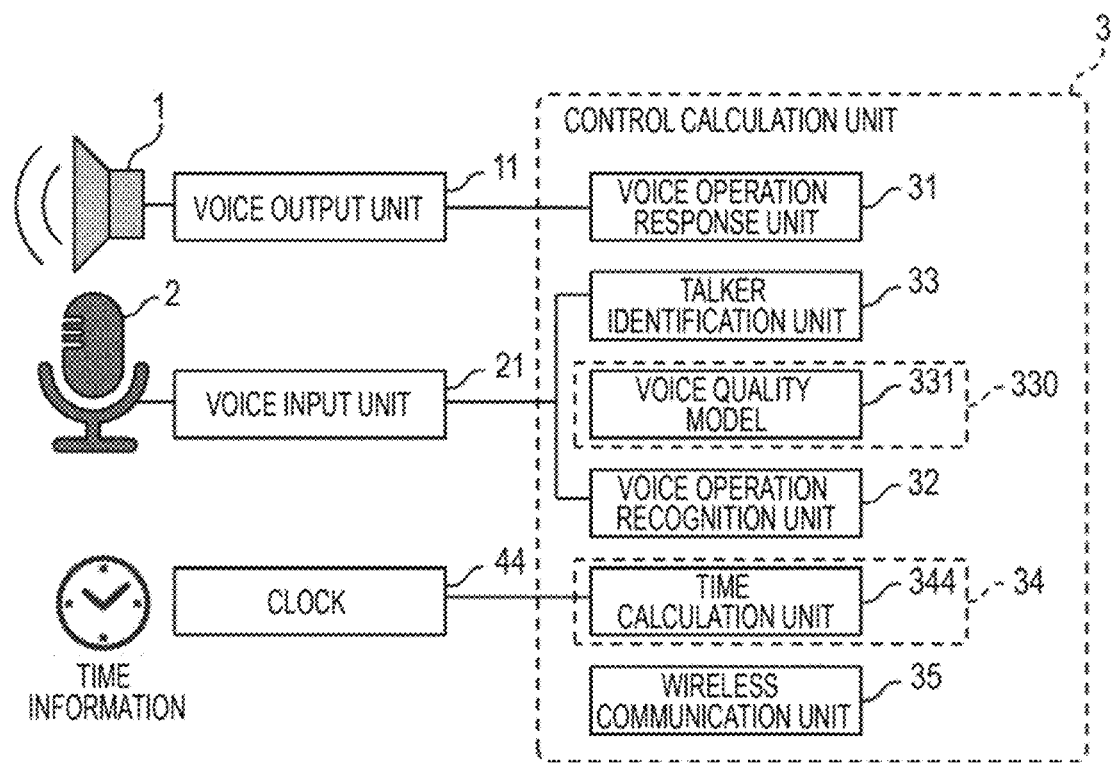
FIG. 8 is a block diagram schematically illustrating a configuration of a voice operation apparatus according to a fifth example embodiment.

FIG. 8 is a block diagram schematically illustrating a configuration of a voice operation apparatus according to a fifth example embodiment. The voice operation apparatus of the present example embodiment is different from the above first example embodiment in that a clock 44 and a time calculation unit 344 are provided. The other features are substantially the same as those of the first example embodiment. Features that are different from the first example embodiment will be mainly described below.

The clock 44 can acquire the current time. The time calculation unit 344 calculates the utterance time of a voice operation based on information input from the clock 44. Here, the time calculation unit 344 may be configured to be included in the clock 44. In such a way, the voice operation apparatus of the present example embodiment is characterized by having the time calculation unit 344 as the auxiliary information calculation unit 34 that calculates auxiliary information.

For example, the talker identification unit 33 of the present example embodiment determines that a talker of a voice operation is likely to be the mother when the utterance time of the voice operation is in the daytime. Alternatively, the talker identification unit 33 of the present example embodiment determines that a talker of a voice operation is likely to be the father when the utterance time of the voice operation is late in the night. Such information unique to a user is registered in advance in the registered user information 330 in association with the time information.

The flowchart of the above first example embodiment illustrated in FIG. 3 and the flowchart of the above second example embodiment illustrated in FIG. 5 can be applied to a voice operation method according to the voice operation apparatus of the present example embodiment except that the auxiliary information is time information.

As described above, the voice operation apparatus of the present example embodiment further has the clock that acquires the utterance time of a voice operation as the time information. Further, the talker identification unit identifies a talker by using the time information. According to such a configuration, a voice operation apparatus and a control method thereof that can further improve accuracy of talker identification can also be provided.

Sixth Example Embodiment

Figure 9:
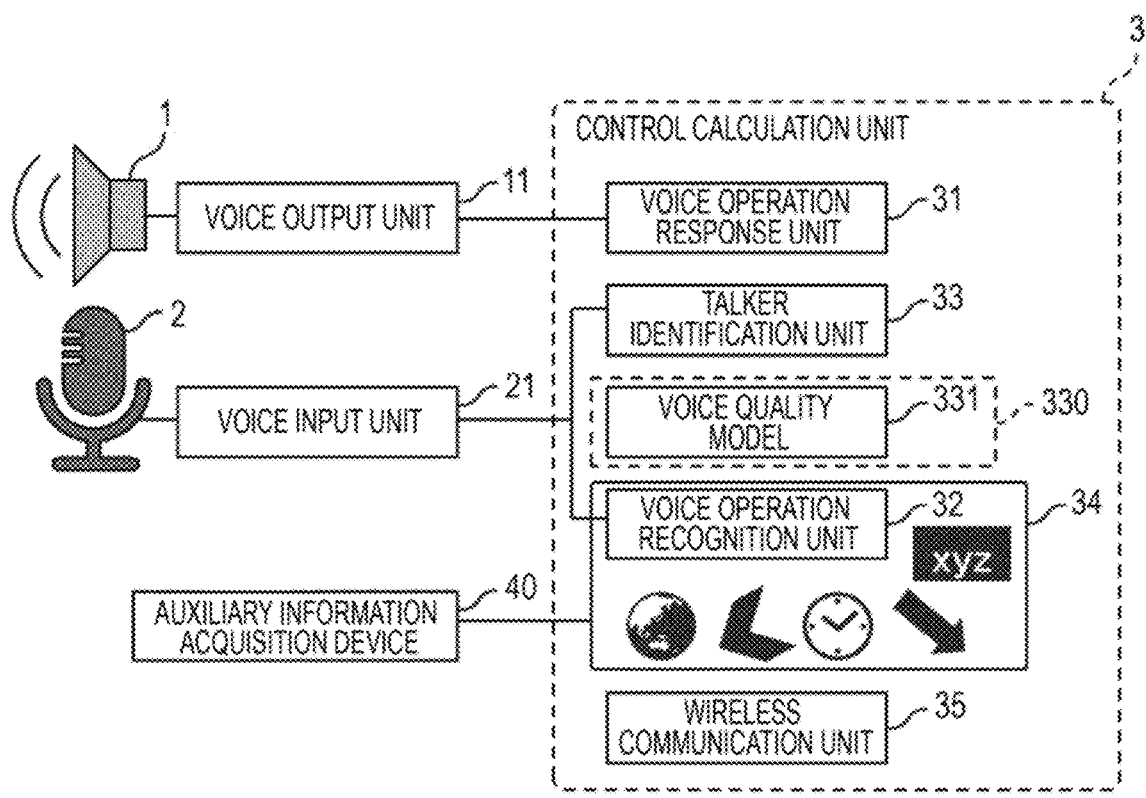
FIG. 9 is a block diagram schematically illustrating a configuration of a voice operation apparatus according to a sixth example embodiment.

FIG. 9 is a block diagram schematically illustrating a configuration of a voice operation apparatus according to a sixth example embodiment. The voice operation apparatus according to the present example embodiment has a configuration in which the features of the example embodiments described above are combined. An auxiliary information acquisition unit 40 illustrated in FIG. 9 includes at least one of the GPS device 41, the array microphone 42, the ranging sensor 43, and the clock 44 of the example embodiments described above. Further, the auxiliary information calculation unit 34 illustrated in FIG. 9 includes at least a configuration that can process auxiliary information output from the auxiliary information acquisition unit 40 of the voice operation recognition unit 32, the position calculation unit 341, the voice direction calculation unit 342, the distance calculation 343, and the time calculation unit 344 of the example embodiments described above. Here, the auxiliary information calculation unit 34 may be configured to be included in the auxiliary information acquisition unit 40.

The above flowcharts illustrated in FIG. 3 and FIG. 5 can be applied to a voice operation method in the voice operation apparatus of the present example embodiment except that the auxiliary information is a combination of the voice operation information, the position information, the direction information, the distance information, and the time information of the example embodiments described above.

As described above, the voice operation apparatus of the present example embodiment has the talker identification unit that identifies a user as a talker of the voice operation based on voice information and a voice quality model of a user registered in advance. Further, the talker identification unit identifies a talker by using, as the auxiliary information, at least one of the voice operation information, the position information on the voice operation apparatus, the direction information on a talker, the distance information on a talker, and the time information. According to such a configuration, a voice operation apparatus and a control method thereof that can further improve accuracy of talker identification can be provided.

Other Example Embodiments

Note that all the example embodiments described above are mere embodied examples in implementing the example embodiments, and the technical scope of the example embodiments should not be construed in a limited sense by these example embodiments. That is, the example embodiments can be implemented in various forms without departing from the technical concept or the primary features thereof.

For example, schedule information on a user may be registered in the registered user information 330 in advance, and the similarity may be corrected in accordance with the schedule information. As an example, when a father travels on business in the schedule information, −5 points are added to the similarity 1/s between the voice information input from the voice input unit 21 and the father's voice quality model 331.

Alternatively, the loudness of voice unique to a user is registered in the registered user information 330 in advance, and the similarity may be corrected in accordance with the loudness of voice in a voice operation. As an example, when the loudness of voice in a voice operation is large, +5 points are added to the similarity 1/s between the voice information input from the voice input unit 21 and the father's voice quality model 331.

Information such as the direction or the distance in which a user is likely to exist may be registered in advance in the registered user information 330 in association with the auxiliary information, or the voice operation apparatus may be configured to learn at any time. When the voice operation apparatus learns, the correction value of the similarity is registered on a user basis in the registered user information 330 in advance, and a result of talker identification is reflected to the correction value. Alternatively, the voice operation apparatus may always collect a keyword uttered by a user and information such as a position, a direction, a distance, or time and update the information unique to the user of the registered user information 330 in accordance with the above information. Thereby, the talker identification unit 33 learns the correlation between the information unique to the user registered in the registered user information 330 and the auxiliary information input via the auxiliary information calculation unit 34. Thus, every time an operation process corresponding to the voice operation is performed, the taker identification unit 33 can improve accuracy of talker identification.

Further, when multiple types of auxiliary information are used together as with the sixth example embodiment, the auxiliary information used in talker identification or a combination thereof may be selected in accordance with the position, the direction, or the like of a user. In such a case, the information unique to the user such as the position or the direction where a user is likely to exist may be registered in the registered user information 330 in advance, and the auxiliary information used in talker identification may be selected in accordance with the above information, or the voice operation apparatus may be configured to learn at any time.

Further, the above flowchart of the first example embodiment illustrated in FIG. 3 and the above flowchart of the second example embodiment illustrated in FIG. 5 can be applied to the first example embodiment to the sixth example embodiment described above. That is, any of the method in which a plurality of voice quality models 331 is registered on a user basis in advance and the voice quality model 331 is selected in accordance with the auxiliary information and the method in which information unique to a user is registered in association with the auxiliary information in advance and the similarity is corrected in accordance with the auxiliary information may be used.

The whole or part of the example embodiments disclosed above can be described as, but not limited to, the following supplementary notes.

(Supplementary Note 1)

A voice operation apparatus comprising:
 a talker identification unit that, based on voice information and a voice quality model of a user registered in advance, identifies the user as a talker of a voice operation; and
 a voice operation recognition unit that performs voice recognition on the voice information and generates voice operation information,
 wherein the talker identification unit identifies a talker by using, as auxiliary information, at least one of the voice operation information, position information on a voice operation apparatus, direction information on a talker, distance information on a talker, and time information.

(Supplementary Note 2)

The voice operation apparatus according to supplementary note 1 further comprising:
 a microphone that converts voice vibration into the voice information; and
 registered user information in which the voice quality model of the user is registered in advance.

(Supplementary Note 3)

The voice operation apparatus according to supplementary note 2,
 wherein the registered user information has a plurality of voice quality models on the user basis, and
 wherein the talker identification unit selects the voice quality model in accordance with the auxiliary information.

(Supplementary Note 4)

The voice operation apparatus according to supplementary note 3, wherein the talker identification unit selects the voice quality model that is a database on the user basis in accordance with the auxiliary information.

(Supplementary Note 5)

The voice operation apparatus according to any one of supplementary notes 2 to 4, wherein the talker identification unit calculates a similarity between the voice information and the voice quality model and identifies a talker based on the similarity.

(Supplementary Note 6)

The voice operation apparatus according to supplementary note 5, wherein the talker identification unit identifies the user having the highest similarity as a talker of a voice operation.

(Supplementary Note 7)

The voice operation apparatus according to supplementary note 5 or 6,
 wherein the registered user information has information unique to the user in association with the auxiliary information, and
 wherein the talker identification unit corrects the similarity in accordance with the auxiliary information.

(Supplementary Note 8)

The voice operation apparatus according to any one of supplementary notes 5 to 7,
 wherein the registered user information has a correction value of the similarity on the user basis, and
 wherein the talker identification unit reflects a result of identifying a talker in the correction value and learns a correlation between the auxiliary information and the correction value.

(Supplementary Note 9)

The voice operation apparatus according to any one of supplementary notes 5 to 8,
 wherein the registered user information includes a keyword unique to the user, and
 wherein the talker identification unit corrects the similarity in accordance with the keyword included in the voice operation information.

(Supplementary Note 10)

The voice operation apparatus according to any one of supplementary notes 2 to 9,
 wherein the microphone is an array microphone that acquires a direction of a talker of a voice operation as the direction information, and
 wherein the talker identification unit identifies a talker by using the direction information.

(Supplementary Note 11)

The voice operation apparatus according to any one of supplementary notes 2 to 10 further comprising a ranging sensor that acquires a distance to a talker of the voice operation as the distance information, wherein the talker identification unit identifies a talker by using the distance information.

(Supplementary Note 12)

The voice operation apparatus according to any one of supplementary notes 2 to 11 further comprising a clock that acquires utterance time of the voice operation as the time information,
 wherein the talker identification unit identifies a talker by using the time information.

(Supplementary Note 13)

The voice operation apparatus according to any one of supplementary notes 2 to 12 further comprising a GPS device that acquires a position of a voice operation apparatus as the position information,
 wherein the talker identification unit selects the voice quality model in accordance with the position information.

(Supplementary Note 14)

The voice operation apparatus according to any one of supplementary notes 2 to 13,
 wherein the registered user information further includes schedule information on the user, and
 wherein the talker identification unit identifies a talker by further using the schedule information.

(Supplementary Note 15)

The voice operation apparatus according to any one of supplementary notes 2 to 14, wherein the registered user information has information customized in accordance with the user's preference on the user basis, the voice operation apparatus further comprising:
 a control calculation unit that performs an operation process in accordance with the user's preference corresponding to the voice operation information; and
 a speaker that provides a notification of a performance result by voice.

(Supplementary Note 16)

A control method of a voice operation apparatus comprising a talker identification unit that, based on voice information and a voice quality model of a user registered in advance, identifies the user as a talker of a voice operation and a voice operation recognition unit that performs voice recognition on the voice information and generates voice operation information, the control method comprising a step of:

at the talker identification unit, identifying a talker by using, as auxiliary information, at least one of the voice operation information, position information on a voice operation apparatus, direction information on a talker, distance information on a talker, and time information.

As described above, while the invention has been described with reference to the example embodiments, the invention is not limited to these example embodiments described above. Various modifications that can be understood by those skilled in the art can be made to the configuration and details of the invention within the scope of the invention.

This application is based upon and claims the benefit of priority from Japanese Patent Application No. 2017-144336, filed on Jul. 26, 2017, the disclosure of which is incorporated herein in its entirety by reference.

REFERENCE SIGNS LIST 1 speaker
2 microphone
3 control calculation unit
11 voice output unit
21 voice input unit
31 voice operation response unit
32 voice operation recognition unit
33 talker identification unit
34 auxiliary information calculation unit
35 wireless communication unit
40 auxiliary information acquisition device
41 GPS device
42 array microphone
43 ranging sensor
44 clock
61 user
62 user
330 registered user information
331 voice quality model
341 position calculation unit
342 voice direction calculation unit
343 distance calculation unit
344 time calculation unit

The invention claimed is:

1. A voice operation system comprising:
an array microphone comprising a plurality of microphones that each detects voice vibration and converts the voice vibration into voice information of a person who is speaking at a current time;
a storage medium that stores registered user information in which: first user information registers a direction of an expected location of a first user and with a first time period in which the first user is expected to be speaking; and
second user information registers a direction of an expected location of a second user and with a second time period in which the second user is expected to be speaking;
a memory storing instructions; and
a processor configured to execute the instructions to:
perform voice recognition on the voice information;
estimate an arrival direction of the voice vibration as detected by the array microphone;
identify that the person who is speaking at the current time is the first user in response to the current time matching the first time period and the arrival direction matching the direction of the expected location of the first user based on the first user information and the estimated arrival direction; and
identify that the person who is speaking at the current time is the second user in response to the current time matching the second time period and the arrival direction matching the direction of the expected location of the second user based on the second user information and the estimated arrival direction.

2. The voice operation system according to claim 1, wherein the processor is further configured to execute the instructions to identify the speaker based on a first voice quality model of the first user and a second voice quality model of the second user that are registered in advance in the registered user information.

3. The voice operation system according to claim 2, wherein the voice quality model is one of a plurality of voice quality models on a per-user basis in the registered user information, and
wherein the processor is further configured to execute the instructions to select each of the first and second voice quality models in accordance with auxiliary information.

4. The voice operation system according to claim 2, wherein the processor is further configured to execute the instructions to calculate a similarity between the voice information and each of the first and second voice quality models and identify the speaker based on the similarity.

5. The voice operation system according to claim 4, wherein the processor is further configured to execute the instructions to identify which of the first and second users that has a highest similarity as the speaker of the voice operation.

6. The voice operation system according to claim 4, wherein the registered user information has information unique to each of the first and second users in association with the auxiliary information, and
wherein the processor is further configured to execute the instructions to correct the similarity in accordance with the auxiliary information.

7. The voice operation system according to claim 4, wherein the registered user information has a correction value of the similarity for each of the first and second users, and
wherein the processor is further configured to execute the instructions to reflect a result of identifying the speaker in the correction value and learn a correlation between the auxiliary information and the correction value.

8. The voice operation system according to claim 4, wherein the registered user information includes a keyword unique to each of the first and second users, and wherein the processor is further configured to execute the instructions to correct the similarity in accordance with the keyword included in the registered user information.

9. The voice operation system according to claim 2, further comprising a ranging sensor that acquires a distance to the speaker of the voice operation as distance information,
wherein the processor is further configured to execute the instructions to identify the speaker by using the distance information.

10. The voice operation system according to claim 2, further comprising a GPS device that acquires a position of the voice operation system as position information,
wherein the processor is further configured to execute the instructions to select the first and second voice quality models in accordance with the position information.

11. The voice operation system according to claim 2, wherein the registered user information further includes schedule information for each of the first and second users, and wherein the processor is further configured to execute the instructions to identify the speaker by further using the schedule information.

12. The voice operation system according to claim 2, wherein the registered user information has information customized in accordance with user preference for each of the first and second users, wherein the processor is further configured to execute the instructions to perform an operation process in accordance with the user preference corresponding to the voice operation information, and wherein the voice operation system further comprises a speaker that provides a notification of a performance result by voice.

13. A control method of a voice operation apparatus, the control method comprising:

performing voice recognition on voice information of a person who is speaking at a current time into which voice vibration has been converted by each of a plurality of microphones of a microphone array;

acquiring registered user information stored in a storage medium and in which:

first user information registers a direction of an expected location of a first user and with a first time period in which the first user is expected to be speaking; and second user information registers a direction of an expected location of a second user and with a second time period in which the second user is expected to be speaking;

estimating an arrival direction of the voice vibration as detected by the array microphone; and identifying that the person who is speaking at the current time is the first user in response to the current time matching the first time period and the arrival direction matching the direction of the expected location of the first user based on the first user information and the estimated arrival direction; and identifying that the person who is speaking at the current time is the second user in response to the current time matching the second time period and the arrival direction matching the direction of the expected location of the second user based on the second user information and the estimated arrival direction.

\* \* \* \* \*